United States Patent [19]

Sakakibara et al.

[11] 4,022,921

[45] May 10, 1977

[54] METHOD OF RETARDING OXIDATION OF EDIBLE FAT OR OIL IN STORED FOOD

[75] Inventors: Sakuichi Sakakibara, Kobe; Ko Sugisawa, Nara; Masanori Yamamoto, Suita; Takashi Kimura; Kazuya Sekiguchi, both of Nara, all of Japan

[73] Assignee: House Food Industrial Company Limited, Higashi-Osaka, Japan

[22] Filed: Oct. 27, 1976

[21] Appl. No.: 736,242

[52] U.S. Cl. .............................. 426/542; 426/610; 426/654

[51] Int. Cl.² ........................................ A23D 5/04

[58] Field of Search ........... 426/541, 542, 654, 610

[56] References Cited

UNITED STATES PATENTS

| 2,457,741 | 12/1948 | Shipner | 426/542 |
| 2,950,975 | 8/1960 | Hervey | 426/542 |
| 3,497,362 | 2/1970 | Patron et al. | 426/542 |
| 3,732,111 | 5/1973 | Berner et al. | 426/542 |

*Primary Examiner*—Jeanette M. Hunter
*Attorney, Agent, or Firm*—Hans Berman

[57] ABSTRACT

The oxidation of fat or oil in stored food and the resulting rancid taste of the stored food are inhibited by the presence of small amounts of young leaves and shoots of *Coriandrum sativum* L., or of the juice or extract obtained from such plant parts.

7 Claims, No Drawings

METHOD OF RETARDING OXIDATION OF EDIBLE FAT OR OIL IN STORED FOOD

This invention relates to the preservation of food containing edible fat or oil, and particularly to a method of retarding or inhibiting the oxidation of fat or oil in stored food and the resulting rancid taste or odor of the stored food.

It has been found that small amounts of young leaves and shoots of *Coriandrum sativum L.*, or of the juice or extract obtained from such plant parts retard the usual oxidation of fat or oil in food stored in contact with atmospheric oxygen and the rancid odor or taste characteristic of the partly oxidized fat or oil.

Coriander, the fruit of the umbelliferour plant *Coriandrum sativum L.*, is used in modern pharmacy to mask the unpleasant taste or odor of other drugs. Its highly aromatic volatile oil (coriandrol) is a favorite ingredient in hot curries and sauces. The fruit also is used in confectionary and as a flavoring ingredient in liqueurs. It lacks an anti-oxidant effect on fat or oil which would be significant for the purpose of this invention.

The anti-oxidant effect is produced by the young leaves and shoots of the same plant, in the fresh or dried condition, by mixtures of these parts, known in Chinese cookery as "shan-tsai" for use in soups, and by the plant ingredients derived from the young leaves or shoots by pressure (juice) or solvents (extract). The plant material will be referred to hereinbelow as "shan-tsai" for the sake of brevity. Amounts of "shan-tsai", its juice or extract which are effective in inhibiting the oxidation of edible fat or oil may be too small to be readily detected by the person consuming the protected food.

When "shan-tsai" is employed as an oxidation inhibitor, it is preferably dried in hot air or freeze-dried and thereafter comminuted. The juice obtained by pressing the fresh or partly dried material is also effective and may be worked up further by boiling followed by centrifuging, or by steam distillation, or by extraction with any one of a wide variety of volatile organic solvents including low boiling petroleum fractions, ethanol, ethyl ether, benzene, carbon tetrachloride, acetone, trichloroethylene, dichloroethane, hexane, and the like. Oils and fats may also be used to extract the effective antioxidant from the leaves and shoots or from their juice.

The active ingredient accounting for the anti-oxidant effect is thermally stable at the temperatures commonly employed in the preparation of foods, and "shan-tsai", its components, or the juice or extract thereof may be added to the food during the preparation thereof at any stage. As little as 0.1% powdered dry "shan-tsai", the juice pressed from a corresponding amount of fresh young leaves and/or shoots, or 0.02% extract prevents spoilage of food by rancidity of the fat or oil therein over several days or months under conditions which would make unprotected food unpalatable, the percentage values being based on the weight of fat or oil. The characteristic aroma of coriander is not perceptible with such small admixtures, and even larger amounts are often masked by ingredients of the food which are either present in larger amounts or have an even stronger aroma.

The anti-oxidant effect of "shan-tsai" and of various derivatives thereof are illustrated in the following Examples in which all percentage values are by weight unless specifically stated otherwise.

EXAMPLE 1

Four batches of beef tallow were mixed intimately with 0.5% "shan-tsai" powder, 1.0% "shan-tsai" powder, 0.1% "shan-tsai" extract, and 0.2% "shan-tsai" extract respectively. The powder was prepared by freeze-drying young leaves and shoots of *Coriandrum sativum L.* and by pulverizing the freeze-dried product. The extract was prepared by extraction of the pulverized material in a Soxhlet extractor with ethyl ether at 65° C for 17 hours and removal of the ether by distillation. A fifth batch of tallow free from "shan-tsai" was used as a control.

The five batches were each held at 97.8° C while atmospheric air was blown through them at a rate of 2.33 ml/sec. Samples were taken prior to aeration and at various times thereafter until the peroxide value of each batch exceeded 100. The peroxide values determined are listed below. The variation of the results obtained prior to aeration is illustrative of the narrow margin of experimental error inherent in the tests.

TABLE I

| No "shan-tsai" added: | | | | | | | | |
|---|---|---|---|---|---|---|---|---|
| Hours | 0 | 7 | 10 | 12 | 13 | 14 | | |
| Peroxide value | 0.625 | 6.68 | 25.1 | 65.7 | 79.2 | 109 | | |
| 0.5% Powder: | | | | | | | | |
| Hours | 0 | 16 | 20 | 24 | 31 | 41 | | |
| Peroxide value | 0.725 | 4.17 | 4.83 | 6.75 | 14.6 | 113 | | |
| 1.0% Powder: | | | | | | | | |
| Hours | 0 | 16 | 20 | 24 | 41 | 64 | 68 | 70 | 71 |
| Peroxide value | 0.585 | 3.63 | 4.01 | 5.75 | 6.58 | 19.8 | 46.5 | 91.0 | 123 |
| 0.1% Extract: | | | | | | | | |
| Hours | 0 | 20 | 35 | 41 | 44 | 45 | | |
| Peroxide value | 0.618 | 3.85 | 20.0 | 48.7 | 69.8 | 103.4 | | |
| 0.2% Extract: | | | | | | | | |
| Hours | 0 | 20 | 41 | 64 | 68 | 71 | 74 | 75 |
| Peroxide value | 0.716 | 3.16 | 5.24 | 17.4 | 22.6 | 39.9 | 56.7 | 103.2 |

As is shown in Table I, a peroxide value above 100 is reached by the untreated tallow in less than 14 hours of aeration. Tallow containing 0.5% "shan-tsai" powder or 0.1% "shan-tsai" extract has a peroxide value of less than 100 for approximately 40 hours of aeration, and more than 70 hours of aeration are needed for a corresponding oxidation in the presence of 1.0% of the powder or 0.2% of the extract.

EXAMPLE 2

A curry roux was prepared by stirring 25 kg wheat flour and 40 kg beef tallow at 120° to 130° C until a fairly homogeneous mixture was obtained. Thereafter, 6 kg salt, 7 kg sugar, 6 kg curry powder, 15 kg seasoning mixture (monosodium glutamate, nucleic acid seasoning, and skim milk powder), and 0.4 kg powdered "shan-tsai" were added with further agitation at about 90° C. The resulting uniform curry roux was cooled to ambient temperature whereupon it solidified.

After six months of storage at ambient temperature and in contact with the ambient air, 75 g of the solid material was dispersed in 300 ml hot water. The curry roux so prepared had a pleasant taste and flavor without any trace of rancidity. A control batch prepared without the "shan-tsai" powder and stored under the same conditions was distinctly rancid.

The "shan-tsai" powder was prepared by drying young leaves and shoots of Coriandrum sativum L. in hot air, and crushing the dried material.

EXAMPLE 3

400 g Sugar, 70 g butter, and 6 whole eggs were combined by beating, seasoned with small amounts of salt and vanilla flavor, and further mixed, in this order, with 0.1 g "shan-tsai" extract, 600 ml milk, 1300 g flour of low protein content, and 40 g baking powder. The resulting dough was rolled out, shaped into doughnuts, and fried in oil at 160° – 165° C. A control batch of doughnuts was made in the same manner but without the "shan-tsai" extract which was prepared from powdered, airdry plant material by extraction with hexane and evaporation of the solvent.

After less than one week, the control batch had developed the slight rancidity characteristic of oxidation of the oil employed in frying, while the doughnuts containing a minimal amount of "shan-tsai" still tasted fresh.

EXAMPLE 4

Instant noodles, a Japanese staple food, were prepared from 25 kg wheat flour, 0.35 kg salt, 0.035 kg Kansui (a mixture of alkali metal carbonates and phosphates), 9 g of a "shan-tsai" extract prepared as in Example 2, and 8.25 liters water. The ingredients were mixed into a dough which was kneaded, rolled, cut into strips, steamed, divided into individual servings, packed in perforated containers, fried in oil, and cooled, as is conventional in itself.

The dehydrated, instant noodles so obtained were stored for about four months before they were reconstituted by immersion in hot soup. They had a good taste without trace of rancidity, and superior in this respect to the taste of a control batch prepared without "shan-tsai".

EXAMPLE 5

8000 g Minced fish meat, 76 g sugar, 18 g salt, 600 g Katakuri-ko (the starch of the dog-tooth violet), 80 ml Mirin (a sweet Sake-like liquid used for cooking), and 5 g powdered "shan-tsai" as used in Example 1 were mixed with water into a plastic mass which could be mixed thoroughly by kneading. The mass was further mixed with 230 g finely chopped carrots, shaped into flat squares and circles, and fried in oil at 100° to 200° C until the pieces rose to the oil surface.

The common Japanese dish Satsuma-age produced in this manner had a pleasant taste and flavor without the rancid smell characteristic of spoiling oil or fat even after several days.

As has been shown in Example 1, the oxidation inhibiting effect of the active agent in the young leaves and shoots of Coriandrum sativum L. increases with increasing amounts of "shan-tsai" powder or extract, and the same quantitative relationship is observed with juice pressed from the fresh plant material. If amounts of "shan-tsai" greater than illustrated in Examples 2 to 5 are employed to provide oxidation protection under unfavorable conditions or over periods of time longer than the storage times specifically considered in these Examples, the "shan-tsai" may impart its characteristic aroma to the stored food.

It has been found that this aroma may be suppressed without significant loss of antioxidant effect by briefly contacting the leaves, shoots, juice, or extract with water in the form of a hot liquid or of steam. A water temperature of at least 80° C is necessary and the contact time should not exceed 30 seconds if the full antioxidant effect is to be preserved.

Steaming of leaves or shoots at ambient pressure for 10 seconds usually gives the best combination of antioxidant effect and suppression of the "shan-tsai" smell. The fresh plant material may be blanched for 15 seconds in water at 90° C for a similar effect. The steamed or blanched young leaves and/or shoots are preferably dried in hot air or in a vacuum before being crushed into powder. If so desired, the powder may be leached with one of the solvents mentioned above to produce an extract having the same advantageous property as the powder of steamed or blanched "shan-tsai".

The amount of extract from steamed or blanched leaves or shoots that will not reveal its presence in stored food by the characteristic "shan-tsai" aroma is 0.02% under almost all circumstances, and 0.2% dry "shan-tsai" powder is undetectable when subjected to pre-treatment with water in the liquid or gaseous state, all percentage values being based on the weight of the fat or oil present.

Food containing enough "shan-tsai", its juice, or its extract to display the specific aroma of "shan-tsai", often considered pleasant, is simultaneously protected against spoilage by rancidity when stored for a period which would not be permissible in unprotected food containing a corresponding amount of fat or oil.

What is claimed is:
1. A method of retarding oxidation of edible fat and oil in stored food which comprises:
   a. mixing said food containing said fat or oil with an amount of an antioxidant selected from the group consisting of young leaves of Coriandrum sativum L., shoots of said Coriandrum, juice of said leaves and shoots, and extract of said leaves and shoots; and
   b. storing said food,
      1. the amount of said antioxidant being sufficient to retard oxidation of said fat or oil and to prevent the formation of the rancid taste characteristic of the oxidized fat or oil during said storing,

2. said food being stored for a period sufficient to cause perceptible rancidity of said fat or oil in the absence of said antioxidant.

2. A method as set forth in claim 1, wherein said antioxidant consists essentially of said leaves or shoots, and said amount is at least 0.1% of dry substance of said Coriandrum based on the weight of said oil or fat.

3. A method as set forth in claim 1, wherein said antioxidant is an extract prepared by extracting said leaves or shoots by means of a volatile solvent and removing said solvent, and said amount is at least 0.02% of said extract based on the weight of said oil or fat.

4. A method as set forth in claim 1, wherein said amount is smaller than the amount of said antioxidant capable of imparting to said food the characteristic aroma of "shan-tsai".

5. A method as set forth in claim 1, wherein said antioxidant, prior to said mixing, is contacted with water in the liquid or gaseous state at a temperature of at least 80° C for not more than 30 seconds.

6. A method as set forth in claim 5, wherein said amount is at least 0.02% of the weight of said fat or oil, and said antioxidant is said extract.

7. A method as set forth in claim 5, wherein said amount is at least 0.1% on a dry basis of the weight of said fat or oil, and said antioxidant consists essentially of said leaves or shoots.

* * * * *